UNITED STATES PATENT OFFICE.

ADOLPH MILLOCHAU, OF NEW YORK, N. Y., ASSIGNOR TO HIMSELF AND ALFRED BERNEY, OF JERSEY CITY, NEW JERSEY.

IMPROVED PROCESS OF PREPARING OIL AS A SUBSTITUTE FOR LINSEED-OIL.

Specification forming part of Letters Patent No. 38,641, dated May 19, 1863.

*To all whom it may concern:*

Be it known that I, ADOLPH MILLOCHAU, of the State, county, and city of New York, have made a certain new and useful improvement upon the method heretofore invented by me of preparing oil to be employed as a substitute for linseed and other analogous oils in grinding and mixing paints and colors; and I hereby declare that the following is a full, clear, and exact description of my said improvement.

The method to which my present invention relates will be found set forth and claimed in an application filed by me this 1st day of May, 1863, for reissue of the Letters Patent of the United States granted to me on the 17th day of March, 1863. By that mode of procedure a very excellent paint-oil is obtained, but it is liable to the objections that it is thicker than is desirable, and will not, when ground or mixed with lead or other pigment, impart as white and clear a color as is most advantageous. This is due to the fact that by the method referred to the impurities in the oil which are derived from the residuum of which it is formed are not entirely removed. These impurities are black, tarry matters, and they give to the paint with which the oil containing them is ground or mixed a slaty tinge instead of a fine perfectly-white color, and also diminish its drying properties.

It is important to obviate these defects; and to that end my further improvement in preparing paint-oil consists in subjecting the liquid, after it has been treated with the alkali according to the method alluded to and after it has been suffered to settle, to one or more distillations, to be performed in the same manner as the distillation of crude petroleum, coal-oil, or other bituminous substances is now practiced, and then permitting the distilled product to stand for about ten hours, (more or less,) after which a thin, limpid, clear oil will be found to be obtained, and this, when used for paint, will impart a pure color, will cover well, and will dry rapidly and thoroughly.

The odor of the oil may, if desired, be partly removed by adding to it, after distilling, a proper quantity—say five per cent. of its bulk—of caustic soda or other alkali.

It will thus be seen that my present invention consists in combining the herein-mentioned process of further distillation of the paint-oil, either with or without the removal of the odor thereof, in the manner indicated, accompanied by the provision for allowing the liquid to settle properly with the mode of procedure described in my aforesaid application for reissue—namely, the washing the acid residuum and then treating it with the alkali and permitting the product to settle after each of these operations.

I therefore claim—

The said combination of these two methods, the whole together constituting a new and useful process for making a fine, clear, and limpid paint-oil from the acid residuum remaining after purification of petroleum, coal-oil, or other bituminous oils, substantially as described.

A. MILLOCHAU.

Witnesses:
BENJ. COZZENS,
S. D. COZZENS.